July 23, 1957 P. W. LEVY 2,800,589
CRYSTAL DOSIMETER
Filed Dec. 14, 1955

INVENTOR.
PAUL W. LEVY
BY
Roland A. Anderson
Attorney

United States Patent Office
2,800,589
Patented July 23, 1957

2,800,589

CRYSTAL DOSIMETER

Paul W. Levy, Sayville, N. Y., assignor to the United States of America as represented by the United States Atomic Energy Commission Application December 14, 1955, Serial No. 553,161

14 Claims. (Cl. 250—83)

The present invention relates to the detection of gamma radiation dosages by means of a compact, inexpensive and easily operable dosimeter. More specifically, it relates to gamma radiation dosimetry by use of a crystal.

There has evolved a wide area of application for gamma radiation with the development of "high" flux sources such as cobalt 60. For example, there have been important results obtained in studies of food sterilization and organic polymerization. Among the dosimeters for gamma radiations being utilized today there are included photographic films, electrical devices (such as ionization chambers) and crystals. Each type has been found to have advantages and disadvantages. However, it has been found for certain applications that crystal dosimetry permits determining radiation quantities with distinct advantages over other methods.

Properties of the ideal instrument for dosimetry were considered at a recent conference and it was propounded that the following factors were of prime importance to an ideal instrument: The instrument should be able to measure radiation quantities over a range of several orders of magnitude. It should measure the dose of radiation and not the specific energy of the ionizing radiation. The rate at which the dose is administered should not affect the integrated result. The ideal instrument should respond uniformly to the radiation coming from all directions and retain the record thereof stably and permanently.

Accordingly, it is an object of the invention to provide a means for measuring quantities of gamma radiation. An additional object of the invention is to provide a dosimeter capable of measuring gamma radiation quantities which vary by several orders of magnitude in intensity and energy. Another additional object of the invention is to provide a method for restoring the dosimeter to its original condition after irradiation. Still another object of the invention is to provide a dosimeter that gives a measure of the integrated dose of radiation independently of the rate at which it is delivered. A further object of the invention is to provide a dosimeter which is uniformly responsive to incident gamma radiation from all directions. A still further object of the invention is to provide a dosimeter for gamma radiation which is chemically inert and whose record of the radiation received is stable. Other objects and advantages will become apparent from the following description taken in connection with the accompanying drawings in which:

This invention provides a crystal for use as a dosimeter whose properties are surprisingly superior to crystal dosimeters used before. It is chemically inert and so can be used safely in contact with living organisms. Further, it is strong and not easily damaged. In addition, the change in the crystal resulting from irradiation does not saturate and is stable. This dosimeter possesses to an unusual extent the characteristics of the ideal monitoring instrument heretofore mentioned.

I have discovered that a crystal of approximately the composition $MgO \cdot 3.5Al_2O_3$ subjected to gamma radiation undergoes a change in its optical transmission of such a nature that the dosage it has received can be correlated with the change. This is in contrast to various other crystals whose record is transient. In this invention there is provided a dosimeter for the utilization of this inherent sensitivity of the optical transmission of a crystal of $MgO \cdot 3.5Al_2O_3$ to gamma radiation. The crystal is exposed to gamma radiation, and the dosage received is evaluated by comparing the optical transmission of the crystal before and after irradiation.

In accordance with the invention the gamma radiation sensitive dosimeter comprises a crystal composed of magnesium oxide and aluminum oxide in the ratio of one molecule of the former to approximately 3.5 molecules of the latter. It has been found that the crystal can be conveniently grown by the Verneuil process (see Annales de Chimie et de Physique, vol. 3, pp. 20–48, 1904). The crystal may be shaped by cutting with a diamond wheel. The lateral surfaces are polished to a standard window glass or spectacle finish preferably in accordance with Bureau of Standard's specifications for this type of finish. With a standard optical finish, the results obtained may more easily be compared from crystal to crystal. The polishing should preferably be done before exposure to the radiation so that some of the effects of the irradiation are not, even if only slightly, polished away. To use it as a gamma radiation dosimeter the crystal is calibrated for gamma radiation dosage against percent optical transmission or optical density at a wave length in the region of its stable record, as explained more fully hereafter.

Figure 1:
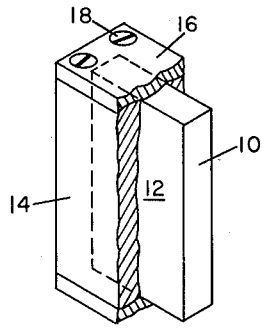
Figure 1 is an isometric view partly in section of an embodiment of the invention and shows a form of the dosimeter in accordance with this invention.

Figure 1 shows one embodiment of a complete dosimeter. The crystal of $MgO \cdot 3.5 Al_2O_3$ is indicated by reference numeral 10. The crystal has two parallel faces 12 which have a spectacle finish so that the reflection property of the crystal is standardized. A container 14 serves to house the crystal and filter out radiation other than gamma. In this instance it is made of 1/16 inch aluminum, but other filters may be used. The crystal is retained by an aluminum lid 16 fixed to the container proper by screws 18. In this form the dosimeter is very sturdy and can measure gamma radiation in the presence of beta radiation as well as alpha radiation.

Figure 2:
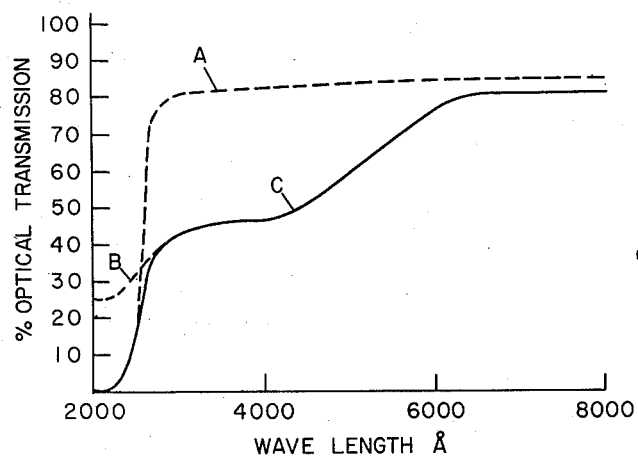
Figure 2 is a graph of the percent optical transmission against wave length for a dosimeter in accordance with this invention before and after exposure to a quantity of gamma radiation.

Figure 2 shows curves obtained from measurement of the percent optical transmission of a crystal in accordance with this invention, before and after its exposure to a particular quantity of gamma radiation. Curve A is a plot of the relation between the percent optical transmission and the wave length of the unirradiated crystal; curve B is a plot of the same relation immediately after irradiation by $8 \times 10^6$ roentgen and curve C is a plot of the same relation 24 hours after the crystal has been exposed to $8 \times 10^6$ roentgen. This latter curve remains the same indefinitely unless the crystal is specially treated as specified later.

As indicated in Figure 2, it has been found that the ultraviolet transmission from 2000 Angstrom units to approximately 2500 Angstrom units is increased by the irradiation but the change fades. From 2500 Angstrom units to 1 micron the induced change in optical transmission is immediately stable and, surprisingly, does not change with time. Neither normal amounts of light nor, as indicated hereafter, moderate changes in temperature affect it.

Figure 3:
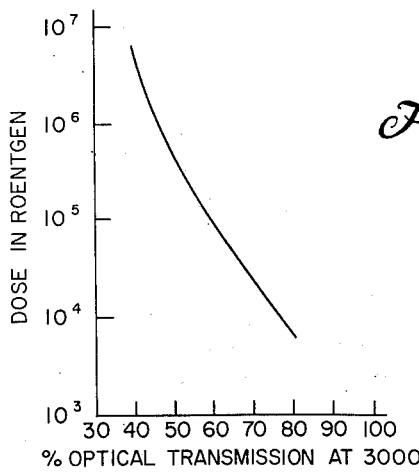
Figure 3 is a graph of gamma radiation dose in roentgents against percent optical transmission at a particular ultraviolet wave length for a dosimeter in accordance with this invention.

It is to be noted that various wave lengths can be selected for calibration of the percent optical trnasmission of the crystal against gamma radiation dosage. However, for greatest sensitivity, a wave length in the region of maximum spread between the curves A and C of Figure 2 is selected, such as 3000 Angstrom units. A plot of the gamma radiation dose in roentgens is indicated as a function of optical transmission at 3000 Angstrom units in Figure 3, and this serves as a calibration curve.

Once the lateral surfaces through which the measuring ultraviolet light is to be transmitted are polished to a spectacle finish, the percent optical transmission of crystals with different thicknesses can be compared and correlated. A measurement of the optical density of the crystal, which can be obtained from a measurement of the percent optical transmission, permits comparison of the dosages received by crystals of different thicknesses.

The measurements of optical transmission can conveniently be made with a spectrophotometer. However, the invention can be practiced with many other techniques. For example, visual observation may be used with an optical filter and waxed papers previously calibrated for their monochromatic transmission properties.

The size and shape of the dosimeter crystal should be chosen with reference to the particular application and to the method to be used for quantitative measurement of the radiation effects. However, the invention can be practiced with more or less convenience with any shape of crystal and any suitable method of measurement. For example, a thin rectangular crystal of lateral surface dimensions 6 mm. by 14 mm. can be conveniently used with commercially available spectrophotometers. By using micro-spectrophotometric techniques a rectangular crystal with lateral surface dimensions as small as 1 mm. can be used.

While any given thickness of crystal can be utilized for a wide range of gamma radiation, it is advantageous that when the intensity of gamma rays is greater, the crystal should be thinner. With a spectrophotometer the percent optical transmission can be determined with maximum accuracy when it is something like 60% to 70%. Therefore, if only a small quantity of radiation is to be measured, it is convenient for the crystal to be relatively thick since the percent change in optical transmission increases in magntiude with increasing thickness of the crystal. For example, dosages from $10^2$ to $10^{10}$ roentgen can be readily detected by use of crystals which vary in thickness from 5 mm. to 0.01 mm. As pointed out above, the change in optical density permits an unambiguous determination of the dosage whatever the thickness of the crystal. While the dosimeter in accordance with this invention has the inherent property of being able to record gamma radiation quantities almost from 0 to an infinite number of roentgens, practical difficulties of measuring the change in optical transmission of the crystal with sufficient accuracy limit the range of its utility. The relative amount of energy that the incident gamma radiation loses in the crystal is small and the crystal may be considered to be transparent thereto. However, for unusually thick crystals corrections may have to be made for reduction of the gamma radiation flux in passing through.

While the crystal need not be encased in a container if gamma radiation alone is present, for use in the presence of beta and alpha radiation there should be approximately 1/16 inch of aluminum or the equivalent surrounding the crystal. The aluminum acts as a filter to remove the beta and alpha radiation. Where alpha particles alone are present, they may readily be filtered out even by a piece of paper. By means of a proper calibration in a beta radiation field the crystal can be used as a beta radiation dosimeter.

Figure 4:
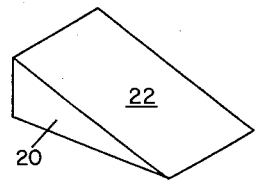
Figure 4 is an isometric view of another form of dosimeter in accordance with this invention.

Figure 4 shows a wedge-shaped crystal 20, in accordance with this invention, which is suitable for making measurements at the maximum accuracy of the spectrophotometer. Such a shape obviates the need to select the optimum thickness of crystal for a particular application. The lateral surfaces 22 meet to form the faces of the wedge. The thickness of interest is the tapering dimension between said lateral surfaces 22. As pointed out above, a spectrophotometer provides information with maximum accuracy in a certain range of operation, such as 60% or 70% optical transmission. With a wedge-shaped crystal, however, the percent optical transmission will depend upon the position on the surface 22 of the wedge through which the measuring ultraviolet light is transmitted. Thus, by selecting the position on surface 22 at which to make the measurement, the percent optical transmission of the ultraviolet light can be selected in the best range of the spectrophotometer. This light is transmitted through upper angular face 22 of the wedge 20 and the opposite lower angular face. These faces have a spectacle finish so that the reflection property of the crystal is standardized. The wedge-shaped crystal is just one convenient shape of the more general cinfiguration where there are two surfaces which form an angle slightly less than 90°. The advantages described for the wedge-shaped crystal are found equally in other shapes in accordance with this more general configuration.

After exposure to radiation the crystal is easily restored to its original condition by heat treatment. I have discovered that this is simply done by heating it at a temperature between 750° C. and 1500° C. for a time requisite to remove the gamma radiation induced change in optical transmission. For example, heating approximately 1 hour at 1000° C. effectively restores the unirradiated condition. The crystal may then be re-used as if it had never been exposed before.

The utility of the invention in medical applications is apparent. Since the crystal dosimeter in accordance with this invention is small, it may be incapsulated and inserted on or in the body of a living organism and there serve as a dose-measuring device for radiation treatments, such as in gamma radiation therapy using cobalt 60. The present dosimeter satisfies in large measure the need for an adequately sensitive dosimeter that can be easily sterilized. It is also useful in food sterilization by gamma irradiation. Here it is also important to determine the requisite dose for adequate sterilization and the present invention is eminently suited for this purpose.

A major defense problem today is the protection of personnel exposed to the effects of a radioactivity producing weapon. In order for medical personnel to be able ot take care of the injured efficiently and effectively it is necessary that they have a means available of determining the extent of radiation to which the injured have been exposed. This invention provides such a means.

While there have been described certain embodiments of the invention, it will be understood that various modifications may be made therein and it is intended to cover all such modifications as fall within the scope of the appended claims.

I claim:

1. A dosimeter, particularly for gamma radiation, comprising a crystal of $MgO \cdot 3.5Al_2O_3$, said crystal having one dimension of such thickness that the change in optical transmission on exposure to said radiation does not saturate and is measurable, said change being both stable and bleachable.

2. A dosimeter, particularly for gamma radiation, comprising a parallel-faced crystal of $MgO \cdot 3.5Al_2O_3$, said crystal having dimensions between parallel faces thereof of such thickness that the change in optical transmission of the crystal between said faces on exposure to said radiation does not saturate and is measurable, said change being both stable and bleachable.

3. A dosimeter as defined in claim 2 wherein said parallel faces have a spectacle finish.

4. A dosimeter, particularly for gamma radiation, comprising a wedge-shaped crystal of MgO·3.5Al$_2$O$_3$, the tapering dimension between the lateral surfaces of said crystal being of such thickness that the change in optical transmission of the crystal on exposure to said radiation does not saturate and is measurable, said change being both stable and bleachable.

5. A dosimeter, particularly for gamma radiation, comprising a crystal of MgO·3.5Al$_2$O$_3$ with two surfaces which form an angle less than 90°, the distance between said surfaces being such that the change in optical transmission of the crystal on exposure to said radiation is measurable, said change being both stable and bleachable.

6. A crystal as defined in claim 5 wherein said two surfaces have a spectacle finish.

7. A dosimeter as defined in claim 4 wherein the lateral faces of said wedge-shaped crystal have a spectacle finish.

8. In the method for measuring gamma radiation comprising exposing a crystal of MgO·3.5Al$_2$O$_3$ to said radiation to cause a change in optical transmission of the crystal which does not saturate, said change being stable and a measure of the gamma radiation received, the step of restoring the crystal from the irradiated condition to the unirradiated condition by heating said crystal within the range 750° C. to 1500° C. to remove gamma radiation induced changes in optical transmission.

9. A method for measuring gamma radiation which comprises exposing a crystal of MgO·3.5Al$_2$O$_3$ to said radiation to cause a change in the optical transmission thereof which does not saturate, said change being a measure of the gamma radiation received and being both stable and bleachable.

10. A method for measuring radiation which comprises exposing a crystal of MgO·3.5Al$_2$O$_3$, grown from MgO and Al$_2$O$_3$ in the proportion one molecule of MgO to approximately 3.5 molecules of Al$_2$O$_3$, to gamma radiation to cause a change in optical transmission of the crystal, said change being a measure of the gamma radiation received, and interposing between said crystal and said gamma radiation a filter transparent only to said gamma radiation.

11. A dosimeter comprising a crystal of a material grown from MgO and Al$_2$O$_3$ in the proportion of one molecule of MgO to approximately 3.5 molecules of Al$_2$O$_3$, said crystal having one dimension of such thickness that the change in optical transmission on exposure to gamma radiation is measurable, and a container therefor to house said crystal and filter out radiation other than gamma.

12. A dosimeter comprising a parallel-faced crystal of a material grown from MgO and Al$_2$O$_3$ in the proportion one molecule of MgO to approximately 3.5 molecules of Al$_2$O$_3$, said crystal having dimensions between the parallel faces of such thickness that the change in optical transmission of the crystal therebetween on exposure to gamma radiation is measurable, and a container to house said crystal and filter out radiation other than gamma.

13. A dosimeter, particularly for gamma radiation, comprising a wedge-shaped crystal of a material grown from MgO and Al$_2$O$_3$ in the proportion one molecule of MgO to approximately 3.5 molecules of Al$_2$O$_3$ and having one dimension of such thickness that the change in optical transmission of the crystal on exposure to gamma radiation is measurable, and a container to house said crystal and filter out radiation other than gamma.

14. A dosimeter, particularly for gamma radiation, comprising a crystal with two surfaces which form an angle less than 90° of a material grown from MgO and Al$_2$O$_3$ in the proportion one molecule of MgO to approximately 3.5 molecules of Al$_2$O$_3$, the distance between said surfaces being such that the change in optical transmission of the crystal therebetween on exposure to said radiation is measurable, and a container to house said crystal and filter out radiation other than gamma.

References Cited in the file of this patent

A Neutron Diffraction Study of Magnesium Aluminum Oxide, G. E. Bacon, Acta Cryst. 5, pp. 684–686, Sept. 10, 1952, also Sc. Nuclear Physical Abstracts, vol. 6, 1952, #6314.

Saturation in the X-Ray Coloration of Corundum Single Crystals, Hunt et al., Physical Review, 89, page 644, Feb. 1, 1953, also Nuclear Physics Abstracts, vol. 7, 1953, #2181.

Irradiation Induced Photoconductivity in Magnesium Oxide, H. R. Day, Physical Review 91, pages 822–827, Aug. 15, 1953, also Nuclear Physics Abstracts, vol 7, 1953, #5648.